(12) United States Patent
Park et al.

(10) Patent No.: US 8,544,956 B2
(45) Date of Patent: Oct. 1, 2013

(54) SEAT ADJUSTING MECHANISM FOR VEHICLE

(75) Inventors: Gun Young Park, Incheon (KR); Heon Pil Lim, Incheon (KR)

(73) Assignee: Austem Co., Ltd., Cheonan-si (KR)

( * ) Notice: Subject to any disclaimer, the term of this patent is extended or adjusted under 35 U.S.C. 154(b) by 208 days.

(21) Appl. No.: 13/120,322

(22) PCT Filed: Dec. 24, 2008

(86) PCT No.: PCT/KR2008/007637
§ 371 (c)(1),
(2), (4) Date: Mar. 22, 2011

(87) PCT Pub. No.: WO2010/067916
PCT Pub. Date: Jun. 17, 2010

(65) Prior Publication Data
US 2011/0210591 A1    Sep. 1, 2011

(30) Foreign Application Priority Data
Nov. 18, 2008  (KR) .................. 10-2008-0114414

(51) Int. Cl.
*B60N 2/10* (2006.01)
*B60N 2/02* (2006.01)
*B60N 2/04* (2006.01)

(52) U.S. Cl.
USPC ............... 297/326; 297/378.12; 297/336

(58) Field of Classification Search
USPC .............. 297/378.12, 336, 325, 326
See application file for complete search history.

(56) References Cited

U.S. PATENT DOCUMENTS

| 7,201,437 B2 * | 4/2007 | Freijy ............................. 297/61 |
| 7,819,479 B2 * | 10/2010 | Halbig et al. ............ 297/378.14 |
| 2005/0104433 A1 * | 5/2005 | Ganot et al. ............ 297/378.12 |
| 2007/0090670 A1 | 4/2007 | Garland |
| 2007/0236067 A1 * | 10/2007 | Nathan et al. ............ 297/378.12 |

FOREIGN PATENT DOCUMENTS

| JP | 2006213203 A | 8/2006 |
| KR | 1020060004264 A | 1/2006 |

* cited by examiner

*Primary Examiner* — Milton Nelson, Jr.
(74) *Attorney, Agent, or Firm* — Schmeiser, Olsen & Watts LLP

(57) ABSTRACT

The present invention relates to a seat adjusting mechanism for vehicle comprising a seat cushion frame which has at a lower part thereof a latch assembly being locked or unlocked to a locking pin of a vehicle part, a connecting plate which is fixedly coupled to an end part of the seat cushion frame and a seatback frame which is rotatably coupled to an end part of the connecting plate through a recliner, further comprising a driving link which is rotatably coupled to the connecting plate and is rotated in connection with the seatback frame when the seatback frame is rotated; a pre-latch link which is rotatably coupled to the connecting plate apart from the driving link and which, when the driving link is rotated over a predetermined angle, is rotated together to a predetermined extent in contact with the driving link; and a latch link which is rotatably coupled to the connecting plate with the same rotating axis as the pre-latch link and has an end part coupled to a cable end part for an operation of unlocking the latch assembly, and which is contacted, pressed and rotated by the pre-latch link from a predetermined position within the predetermined extent where the pre-latch link is rotated, thus unlocking the latch assembly through the cable end part. According to the present invention, the seat can be folded and erected by just a simple operation if required.

2 Claims, 9 Drawing Sheets

SEAT ADJUSTING MECHANISM FOR VEHICLE

TECHNICAL FIELD

The present invention relates to a seat adjusting mechanism for a vehicle, and more particularly to an enhanced seat adjusting mechanism for a vehicle where a seat can be folded and erected by simply operating a lever of a recliner.

BACKGROUND ART

Conventionally, a seat installed within a vehicle may have a various adjusting mechanism as a user convenience specification.

For example, a vehicle seat may have a recliner for adjusting reclining angle between a seatback and a seat cushion, a folding mechanism for fully folding the seatback onto the seat cushion and a pumping device for adjusting a height of the seat cushion. Also, the vehicle seat may have a latch assembly for attaching/detaching the whole seat onto/from a vehicle body.

However, according to the conventional art, although various additional functions can be provided to a vehicle seat, the number of operating levers or etc. for realizing the functions should be increased as the additional functions are increased.

Therefore, it is not easy for a user who doesn't know properly how to operate each of the levers, which are as many as their functions, as he/she wishes.

Moreover, recently, a function for folding and erecting the whole seat to enlarge a loading space of a back trunk of the vehicle or to provide a passage to a back seat.

In this case, to realize such a function through the conventional vehicle seat as described above, a series of complicated operating processes are required, that is, reclining the seatback by operating a recliner lever, folding the seatback by operating a folding lever and releasing a locking of the latch assembly by operating a latch lever.

Accordingly, there has been required a seat adjusting mechanism for a vehicle which not only provides a various function but also enables its realizing operation to be easily accomplished, thus giving consideration to a user convenience at the same time.

DISCLOSURE OF INVENTION

Technical Problem

It is an object of the present invention to provide an enhanced seat adjusting mechanism for vehicle by which even a simple operation enables a function of a seat to be accomplished, especially a seat adjusting mechanism for vehicle which enables a function of folding and erecting the seat to be easily accomplished when required, for example, when securing a loading space in a vehicle, when providing a passage and etc.

Technical Solution

The foregoing and/or other aspects of the present invention can be achieved by providing a seat adjusting mechanism for vehicle comprising a seat cushion frame which has at a lower part thereof a latch assembly being locked or unlocked to a locking pin of a vehicle part, a connecting plate which is fixedly coupled to an end part of the seat cushion frame and a seatback frame which is rotatably coupled to an end part of the connecting plate through a recliner, further comprising: a driving link which is rotatably coupled to the connecting plate and is rotated in connection with the seatback frame when the seatback frame is rotated; a pre-latch link which is rotatably coupled to the connecting plate apart from the driving link and which, when the driving link is rotated over a predetermined angle, is rotated together to a predetermined extent in contact with the driving link; and a latch link which is rotatably coupled to the connecting plate with the same rotating axis as the pre-latch link and has an end part coupled to a cable end part for an operation of unlocking the latch assembly, and which is contacted, pressed and rotated by the pre-latch link from a predetermined position within the predetermined extent where the pre-latch link is rotated, thus unlocking the latch assembly through the cable end part.

According to an aspect of the present invention, the driving link has at an end part thereof a trigger link which contacts and rotates the pre-latch link and the trigger link is provided to be elastically rotated by the pre-latch link if the driving link is rotated back.

Advantageous Effects

According to the seat adjusting mechanism for vehicle of the present invention as described above, a latch assembly can be unlocked through a driving link which is coupled to a seatback frame and a latch link which is coupled to the driving link and is rotated if the seatback frame is rotated more than a predetermined angle. Therefore, if the seatback is rotated more than its reclining angle, folding of the seatback and unlocking of a latch can be easily accomplished.

That is, a recliner and the latch assembly are coupled to each other in operation, and that the latch assembly can be unlocked when the recliner has passed its normal operating section and reached a range in which folding of the seatback is accomplished.

Accordingly, there is no need to operate additional levers to fold and erect the seat, and only a user's simple operation of the recliner enables the function of folding and erecting the seat.

BEST MODE FOR CARRYING OUT THE INVENTION

Figure 1:
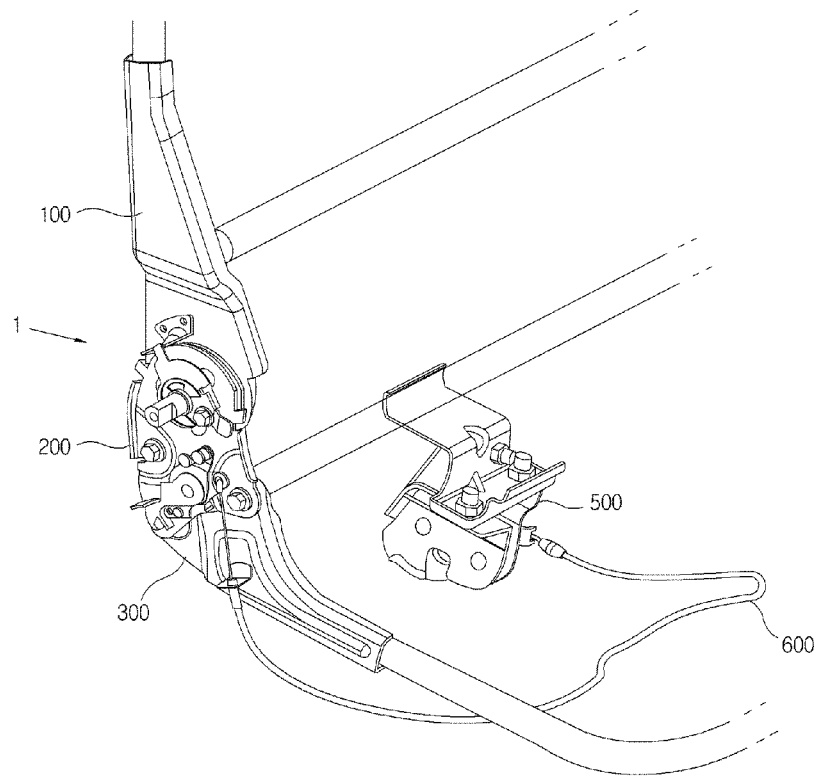
FIG. 1 is a partial perspective view of a vehicle seat according to an exemplary embodiment of the present invention.
Figure 2:
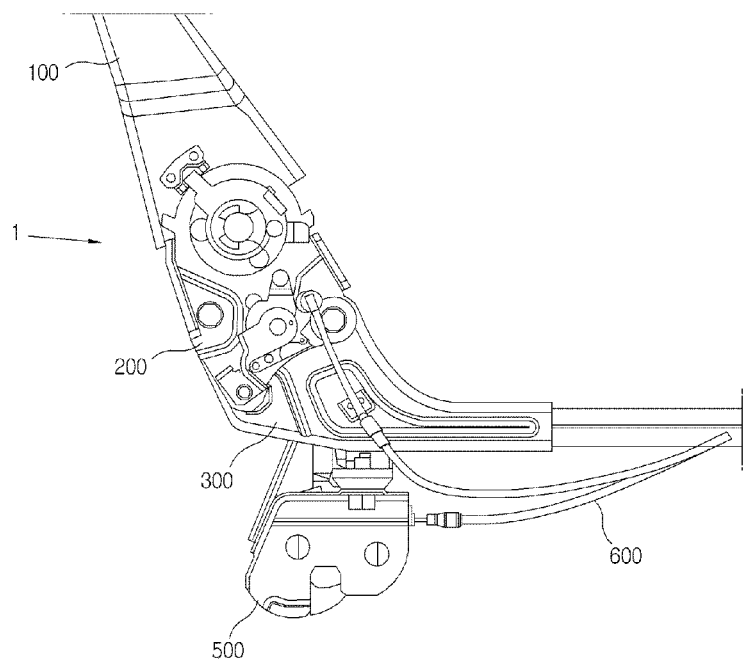
FIG. 2 is a side view of the vehicle seat in FIG. 1.

As shown in FIG. 1 and FIG. 2, a seat adjusting mechanism for vehicle 1 according to an exemplary embodiment of the present invention comprises a seatback frame 100, a connecting plate 200 and a seat cushion frame 300.

The connecting plate 200 is rotatably coupled to a lower end part of the seatback frame 100 through a recliner (refer to 400 in FIG. 3) and the seat cushion frame 300 is fixedly coupled to a lower end part of the connecting plate 200 through a bolt or etc.

A latch assembly 500 is attached to a bottom of the seat cushion 300. The latch assembly 500 is provided to be operated by a cable 600.

Figure 3:
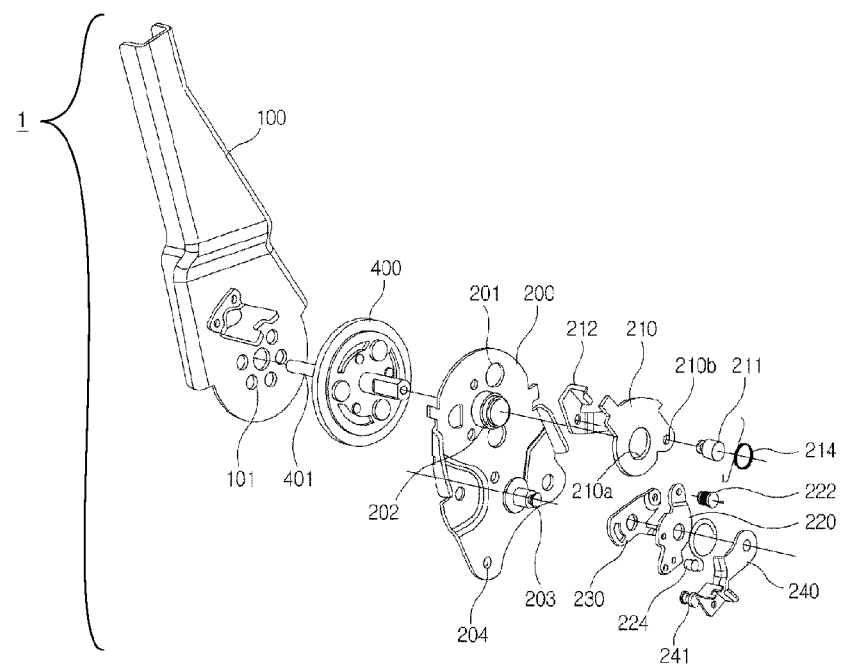
FIG. 3 is an exploded perspective view of a principal part of the vehicle seat in FIG. 1, and FIG. 4 to FIG. 11 are side views to describe an operation process of the vehicle seat in FIG. 1.

FIG. 3 is an exploded perspective view of a principal part of the seat adjusting mechanism for vehicle 1. The recliner 400 is provided between the seatback frame 100 and the connecting plate 200.

The seatback frame 100 is fixedly coupled onto the left side of the recliner 400 through a number of coupling holes 101. Likewise, the connecting plate 200 is fixedly coupled onto the right side of the recliner 400 through a number of coupling holes 201.

A driving shaft 401 of the recliner 400 has its left end part to penetrate the seatback frame 100 and protrude to be coupled to a recliner lever (not shown) through which it is operated by a user.

The recliner 400 is a device for adjusting a reclining and maintaining a reclined sate of the seatback frame 100 with respect to the connecting plate 200, in other words, the seat cushion by the user's operation of its lever.

As a structure and operation of such a recliner 400 have already been published by this applicant and by other many applicants, their detail descriptions are omitted in this specification.

A right end part of the driving shaft 401 is inserted into a bushing 202 of the connecting plate 200 to be rotatably supported.

Also, the seat adjusting mechanism for vehicle 1 according to the exemplary embodiment of the present invention comprises a driving link 210 which is rotatably coupled to the bushing 202 of the connecting plate 200.

The driving link 210 is rotatably coupled to the bushing 202 through a coupling hole 210a.

The driving link 210 has a hinge hole 210b formed at an end part thereof. The hinge hole 210b is inserted by a hinge pin 211 through which a trigger link 212 is rotatably coupled to the driving link 210.

The connecting plate 200 further comprises a hinge link 203 at its lower part. The hinge link 203 is coupled to the connecting plate 200 to protrude apart from the bushing 202.

A pre-latch link 220 and a latch link 230 are layered and rotatably coupled to the hinge link 203 to have the same rotating axis.

A cover bracket 240 is coupled to an upper end part (right end part in FIG. 3) of the hinge link 203. The cover bracket 240 accommodates the pre-latch link 220 and the latch link 230, and at the same time it prevents a separation of the pre-latch link 220 and the latch link 230, thus enabling a stable rotation.

The cover bracket 240 has a left end part which is rotatably coupled to a coupling hole 204 of the connecting plate 200 through a coupling pin 241.

Figure 4:
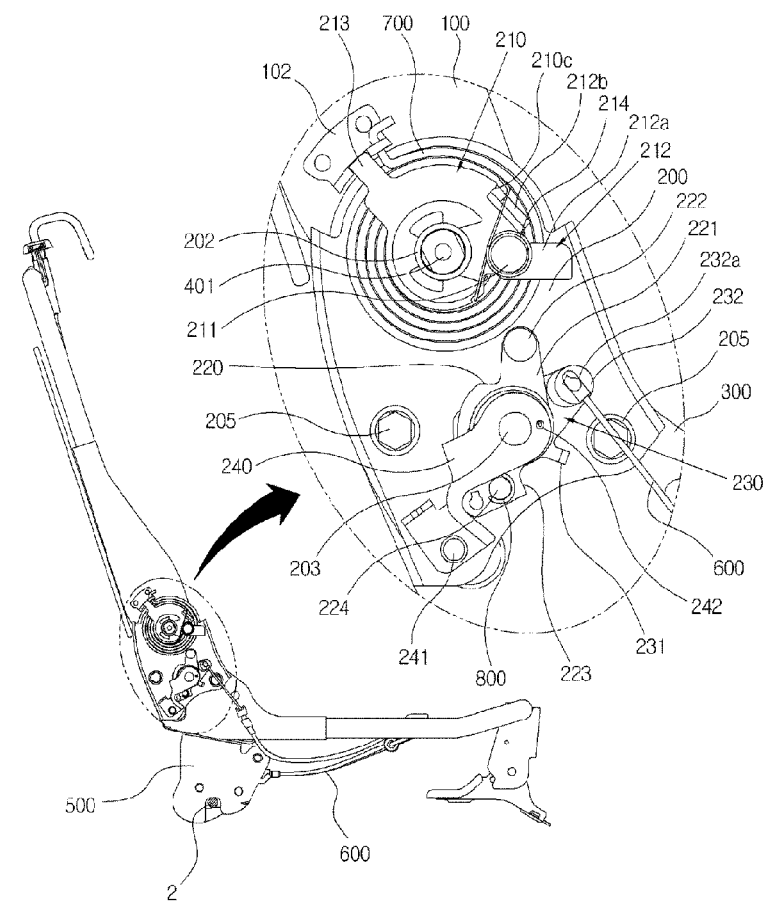

FIG. 4 is a side view showing only a frame part of the vehicle seat where the seat adjusting mechanism for vehicle 1 described above is installed.

As described in FIG. 4, the seatback 100 of the seat in a usual state is maintained to be reclined a little backward according to the user's operation.

As shown in the expanded view in FIG. 4, the driving link 210 has at its left end part a guide protrusion 213 which protrudes in a radial direction. Correspondingly, a holder 102 which is attached to the seatback frame 100 supports both side end parts of the guide protrusion 213 thus maintaining an engagement therebetween.

Therefore, the driving link 210 is restrained by the holder 102 and is provided to rotate around the driving shaft 401 integrally with the seatback frame 100.

A spring 700 is provided at an inside (in a direction into the paper) of the driving link 210. The spring 700 enables the seatback frame 100 to elastically rotate forward (to the right) when the recliner (400 in FIG. 3) is unlocked by the operation of the lever.

The trigger link 212 is rotatably coupled to a right end part of the driving link 210 through the hinge pin 211.

Although the trigger link 212 can freely rotate with respect to the hinge pin 211, it can not further rotate counterclockwise from its state of FIG. 4 because its stepped arm part 212b, which extends in a different radial direction from the trigger arm part 212a, is supported by a stopping part 210c of the driver link 210.

The trigger link 212 is always pressed to rotate counterclockwise by a spring 214.

As shown at a lower part in the expanded view of FIG. 4, the pre-latch link 220 comprises at its upper side an arm part 221 which protrudes in a radial direction and a pre-latch pin 222 which is coupled to an end part of the arm part 221.

As will be described later, when the driving link 210 rotates clockwise, the pre-latch pin 222 is contacted and pressed by the trigger link 212 thus rotating around the hinge link 203.

Also, the pre-latch link 220 comprises at its lower end part a pressing surface 223 which is opposite to the arm part 221. When the pre-latch link 220 rotates counterclockwise to a predetermined angle, the pressing surface 223 presses an operating surface 231 of the latch link 230 thus enabling the latch link 230 to rotate together.

The pre-latch link 220 receives a rotating force clockwise from a spring 800 through a hanging pin 224 provided at a lower end part thereof. Then, the hanging pin 224 becomes in contact with the cover bracket 240 and is prevented from further rotating clockwise.

The other end part of the spring 800 is received and supported in a through hole 242 formed at the cover bracket 240.

The latch link 230 comprises the operating surface 231 which is formed to protrude at a predetermined angle clockwise from the pressing surface 223 of the pre-latch link 220, and a latch operating part 232 which is formed to protrude at a predetermined angle counterclockwise from the operating surface 231.

The latch operating part 232 is coupled to an end of the cable 600 through a hole 232a at a center part thereof.

The cable 600 is elongated due to a counterclockwise rotation of the latch operating part 232 thus enabling an unlocking of the latch assembly 500 which is coupled to the other end of the cable 600.

The latch assembly 500 is a device which is conventionally provided to be operated by the cable 600 to unlock a locking pin 2 and is to be understood from its technical feature generally known in the art. Therefore, a detail technical description of the latch assembly 500 is omitted in this specification and only an operation result thereof will be described.

A lower end part of the connecting plate 200 is integrally coupled to the seat cushion frame 300 through a plurality of bolt coupling parts 205.

FIG. 5 to FIG. 8 show side views of the seat adjusting mechanism for vehicle according to the exemplary embodiment of the present invention by stages from a state where the seat is normally adjusted for the user to be seated thereon to a state where the seat is fully folded and erected to secure a passage or etc.

Figure 5:
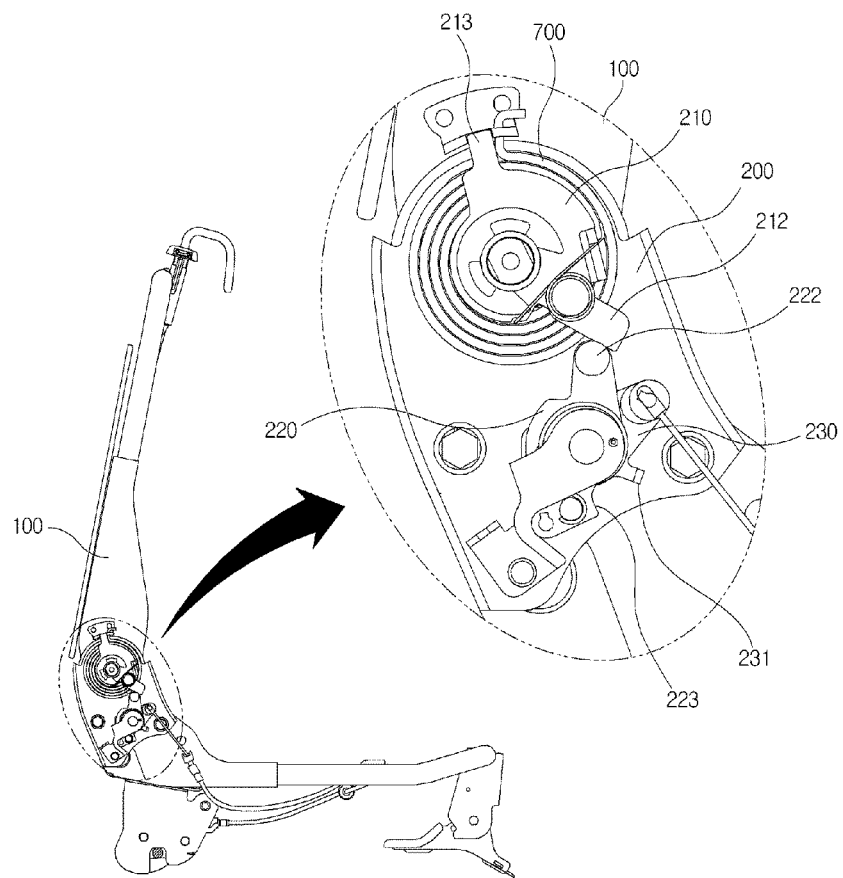

At first, in the state of the seat as shown in FIG. 4, if the user unlocks the recliner 400 (refer to FIG. 3) by operating the lever provided at an end part of the driving shaft 401 of the recliner 400 while the user does not be seated, the seatback frame 100 is rotated forward as shown in FIG. 5 due to the operation of the spring 700.

In this case, the driving link 210 of the connecting plate 200 is rotated forward (in the right direction in FIG. 4) integrally with the seatback frame 100 due to the restriction from the guide protrusion 213. During this process, the trigger link 212 contacts and presses the pre-latch pin 222 of the pre-latch link 220 at the lower part thereof.

The rotating angle of the seatback frame 100 from its normal position shown in FIG. 4 to the position shown in FIG. 5 is set to be large enough, for example, about 30 degrees, so that it can be separated from a comparably small rotating angle, that is a reclining angle, within which the user operates the lever of the recliner 400 for reclining the seat while he/she is seated.

That is, the operation of the seat to be folded and erected is made to be performed in a section which is not overlapped by a section where the normal seat reclining operation is performed, thus preventing an accident that may happen due to the unlocking of the latch assembly (500 in FIG. 1) while the user is seated.

Figure 6:
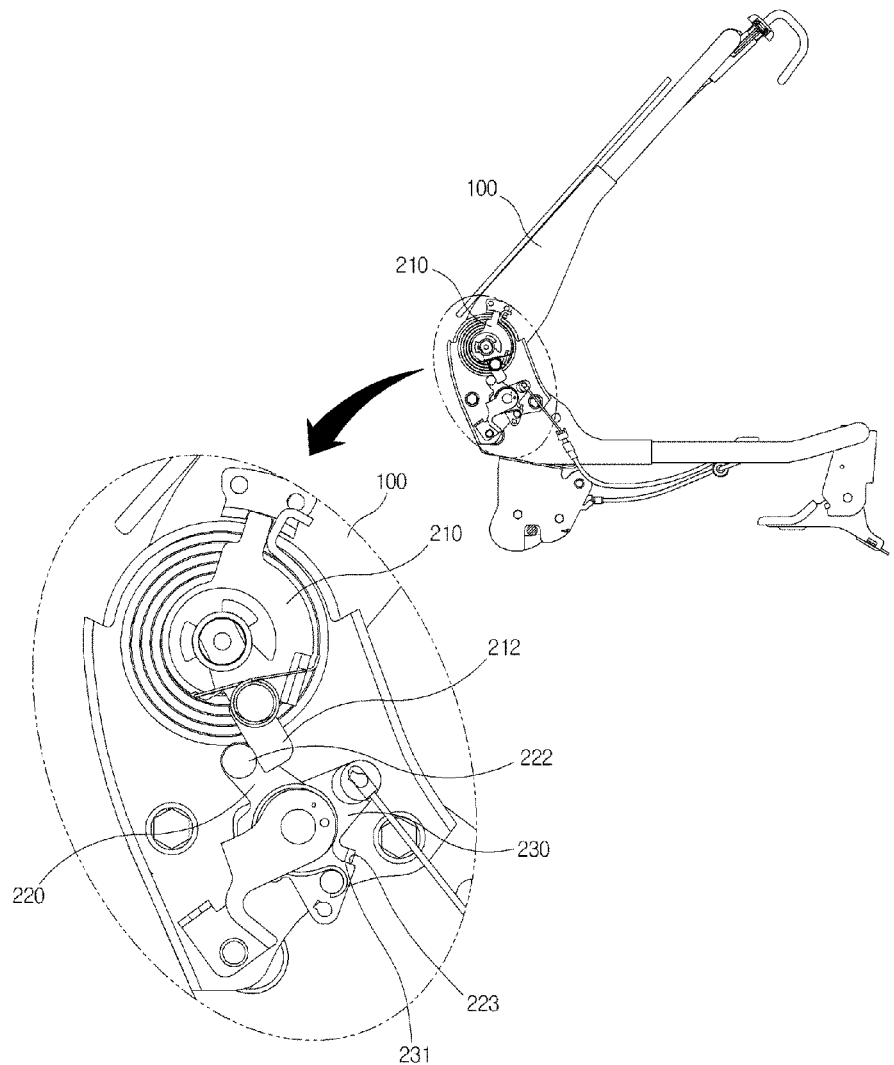

Then, if the seatback frame 100 is further rotated forward when the trigger link 212 and the pre-latch pin 222 are in contact with each other, the driving link 210 is further rotated as shown in FIG. 6, so that the the pre-latch pin 222 is constantly pressed by the trigger link 212 thus the whole pre-latch link 220 is rotated.

In this case, the pressing surface 223 of the pre-latch link 220 is gradually rotated counterclockwise from its position shown in FIG. 5 and eventually becomes in contact with the operating surface 231 of the latch link 230 as shown in FIG. 6.

If the seatback frame 100 is further rotated even after the pressing surface 223 contacts the operating surface 231, not only the pre-latch link 220 but also the latch link 230 is rotated together.

Figure 7:
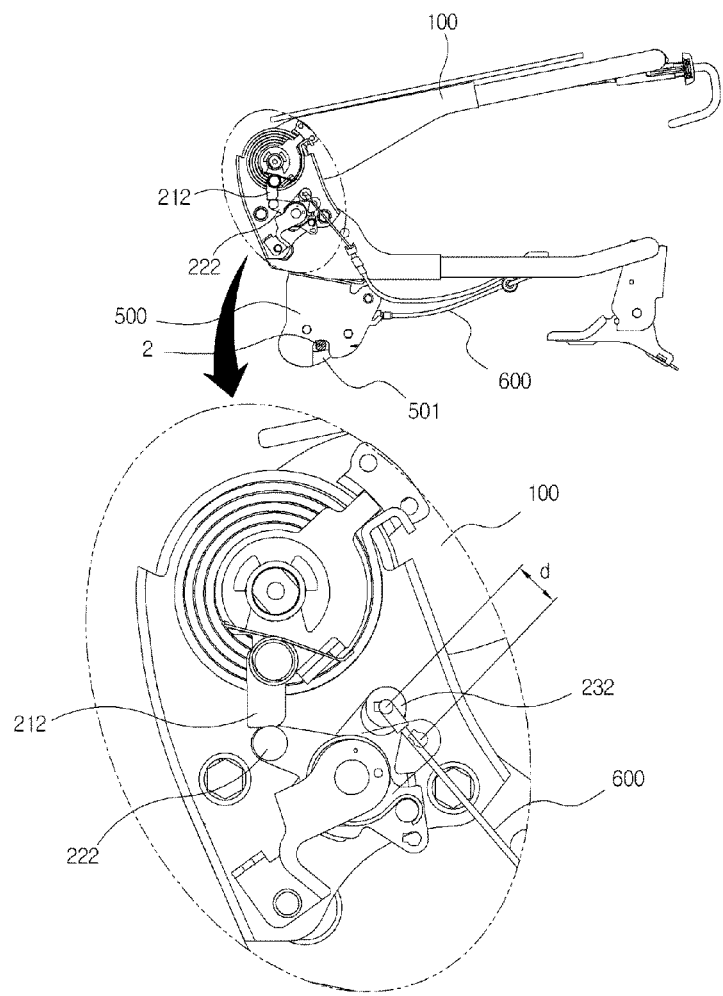

As the latch link 230 is rotated, the latch operating part 232 is rotated counterclockwise to start pulling the cable 600 as shown in FIG. 7. The cable 600 is pulled during the latch link 230 is further rotated, and eventually the latch assembly 500 is unlocked.

FIG. 7 shows a limit state where the trigger link 212 and the pre-latch pin 222 are in contact with each other if the seatback frame 100 is rotated forward. That is, if the seatback frame 100 is further rotated forward from the state shown in FIG. 7, the contact between trigger link 212 and the pre-latch pin 222 ends.

A distance along which the latch operating part 232 pulls the cable 600, that is stroke d, corresponds to the distance in straight line from the position of the latch operating part 232 in FIG. 6 to its position in FIG. 7.

Figure 8:
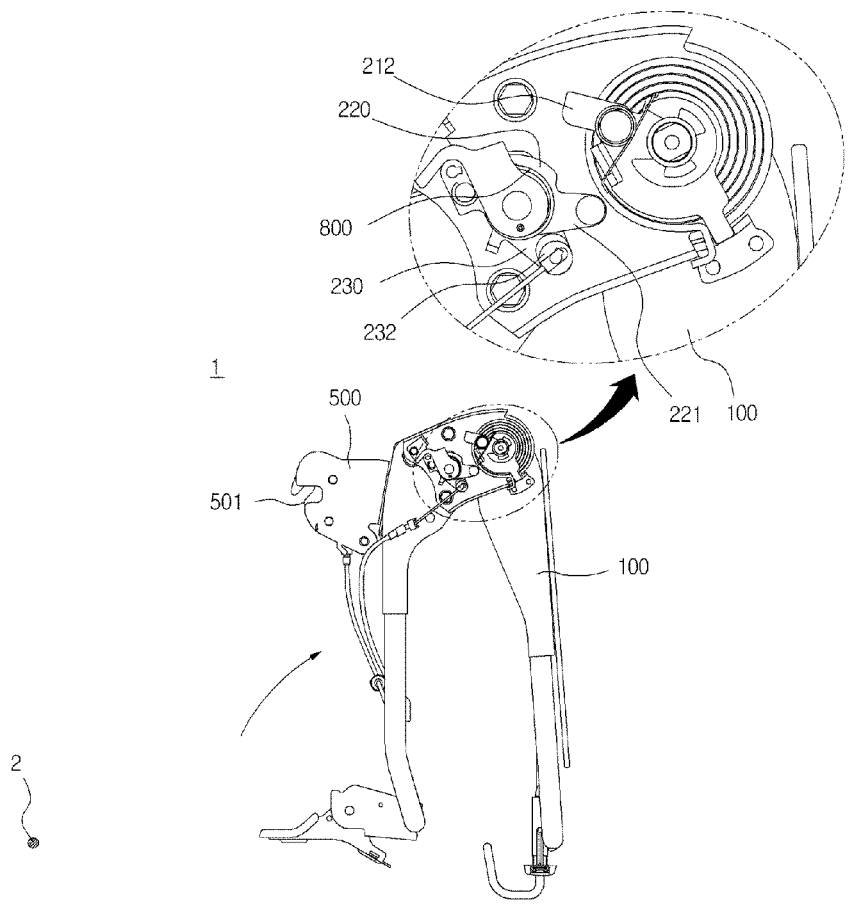

The latch assembly 500 is unlocked at a predetermined point within the stroke of the latch operating part 232 then the locking of a locking member 501 onto the locking pin 2 is released. Therefore, if the seat is erected forward as shown in FIG. 8, the locking member 501 is pushed and rotated by the locking pin 2 which is separating from the latch assembly 500.

If the seatback frame 100 is further rotated forward from its state in FIG. 7, the contact between the trigger link 212 and the pre-latch pin 222 ends.

Accordingly, the trigger link 212 is further rotated clockwise until the seatback frame 100 is fully folded and the pre-latch link 220 is rotated back to its original position due to the operation of the spring 800 (refer to FIG. 5d).

In this case, as the arm part 221 of the pre-latch link 220 and the latch operating part 232 of the latch link 230 are formed to protrude in an axial direction to be overlapped in the axial direction (refer to FIG. 3), the latch link 230 can also be rotated back to some degree due to the pressure from the rotating arm part 221 when the pre-latch link 220 is rotated back.

As soon as the the seatback frame 100 is folded forward, the seat which has the latch assembly 500 unlocked is rotated counterclockwise and erected as shown in FIG. 8 thus finishing the operation of folding and erecting the seat.

In conclusion, according to the seat adjusting mechanism for vehicle 1 of the exemplary embodiment of the present invention, a series of processes for folding and erecting the seat are achieved by just operating the recliner lever, so that the overall operation can be performed conveniently and quickly.

Figure 9:
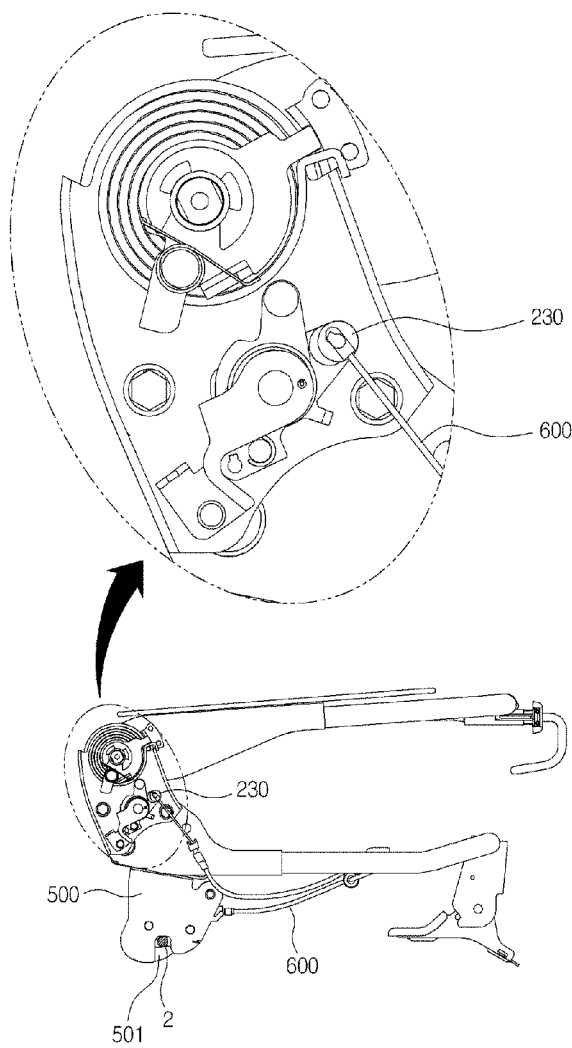
Figure 10:
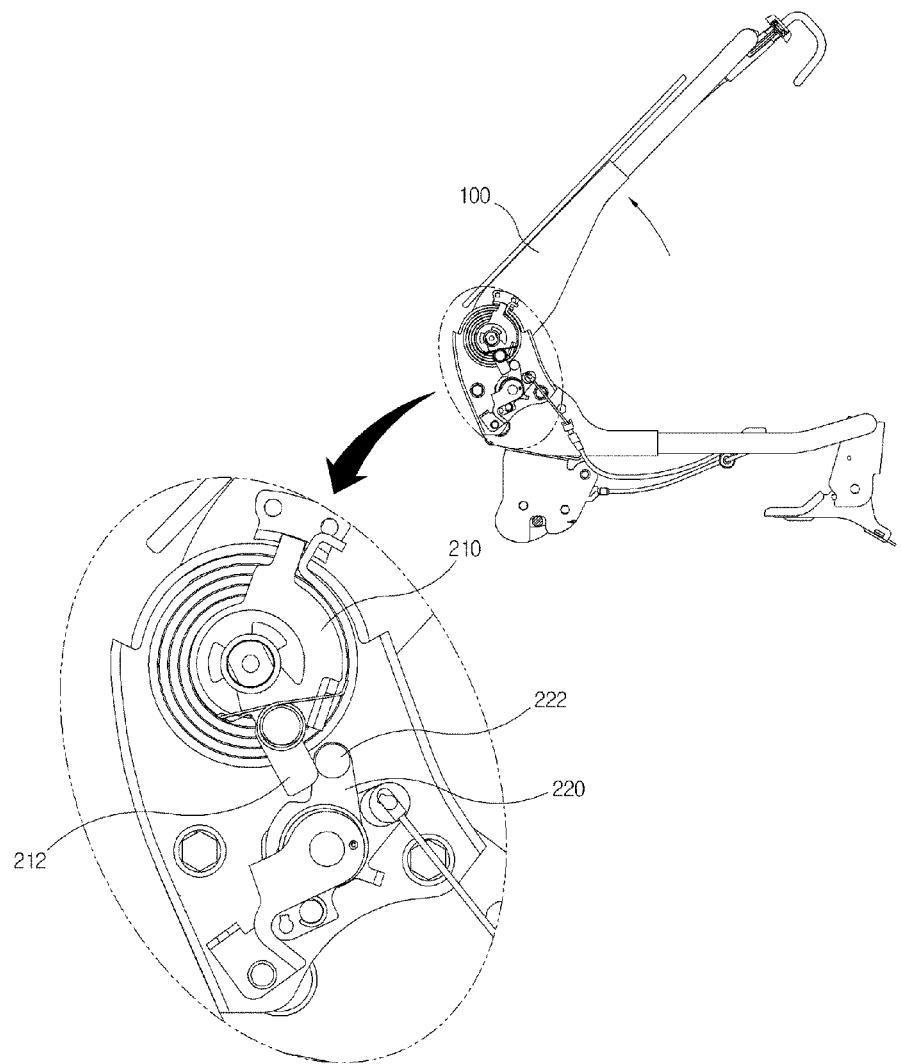
Figure 11:
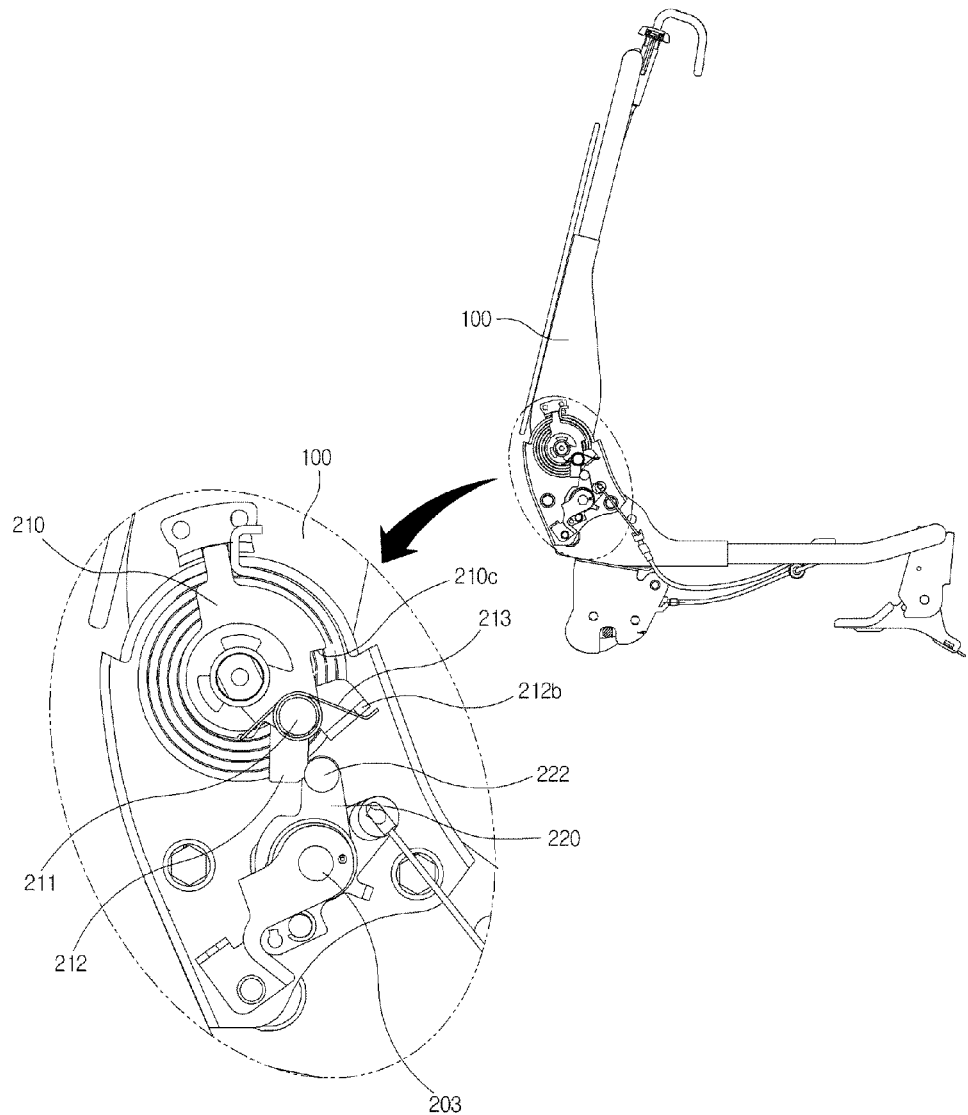

FIG. 9 to FIG. 11 show side views by stages from a state where the seat is fully folded and erected (refer to FIG. 8) to a state where the seat is at its normal position (refer to FIG. 4).

Firstly, if the seat is rotated in the opposite direction, that is counterclockwise from its state shown in FIG. 8, the locking member 501 of the latch assembly 500 approaches the vehicle body. Then, when the locking member 501 is pushed and rotated by the locking pin 2, it is locked by the locking pin 2.

In this case, the cable 600 is pulled due to the locking operation of the latch assembly 500. Accordingly, the latch link 230 coupled to the other end part of the cable 600 is also completely returned to its original position where it is located before (refer to FIG. 4).

Secondly, the folded seatback frame 100 is pulled back as shown in FIG. 10.

In process of pulling back the seatback frame 100, the driving link 210 is rotated counterclockwise together with the seatback frame 100. Also, while being rotated, the trigger link 212 becomes in contact with the pre-latch pin 222 of the pre-latch link 220 as shown in FIG. 10.

If the seatback frame 100 is pulled back further in the state that the trigger link 212 is in contact with the pre-latch pin 222, the trigger link 212 is pushed by the pre-latch pin 222 and is rotated clockwise around the hinge pin 211 as shown in FIG. 11.

If the seatback frame 100 is still further pulled back, the trigger link 212 is pushed by the pre-latch pin 222 and is further rotated clockwise around the hinge pin 211. Then, when the trigger link 212 escapes from a radius of rotation of the pre-latch pin 222 having its center at the hinge link 203, it is rotated back counterclockwise by the spring 213.

The trigger link 212 is rotated back until the stepped arm part 212b becomes in contact with and supported by the stopper part 210c of the driver link 210.

Thereafter, when rotating back of the seatback frame 100 is finished, the seat comes back to its state as shown in FIG. 4.

The above described seat adjusting mechanism for vehicle 1 is only an exemplary embodiment to help understand the present invention and is not to be understood as limiting a scope of patent right or a technical scope of the present invention which is defined in the appended claims and their equivalents.

The invention claimed is:

1. A seat adjusting mechanism for a vehicle comprising a seat cushion frame which has at a lower part thereof a latch assembly being locked or unlocked to a locking pin of a vehicle part, a connecting plate which is fixedly coupled to an end part of the seat cushion frame and a seatback frame which is rotatably coupled to an end part of the connecting plate through a recliner, further comprising:
 a driving link which is rotatably coupled to the connecting plate and is rotated in connection with the seatback frame when the seatback frame is rotated;

a pre-latch link which is rotatably coupled to the connecting plate apart from the driving link and which, when the driving link is rotated over a predetermined angle, is rotated together to a predetermined extent in contact with the driving link; and a latch link which is rotatably coupled to the connecting plate with the same rotating axis as the pre-latch link and has an end part coupled to a cable end part for an operation of unlocking the latch assembly, and which is contacted, pressed and rotated by the pre-latch link from a predetermined position within the predetermined extent where the pre-latch link is rotated, thus unlocking the latch assembly through the cable end part.

2. The seat adjusting mechanism for a vehicle according to claim 1, wherein the driving link has at an end part thereof a trigger link which contacts and rotates the pre-latch link and the trigger link is provided to be elastically rotated by the pre-latch link if the driving link is rotated back.

* * * * *